(12) United States Patent
Doherty et al.

(10) Patent No.: US 12,448,537 B2
(45) Date of Patent: Oct. 21, 2025

(54) CURATIVE FREE JOINT SEALANT

(71) Applicant: Henkel AG & Co. KGaA, Dusseldorf (DE)

(72) Inventors: Michael Doherty, Clane (IE); Nigel Sweeney, Terenure (IE); Brendan Kneafsey, Lucan (IE); David Condron, Rathfarnham (IE); Frances Murphy, Ratoath (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 647 days.

(21) Appl. No.: 17/455,489

(22) Filed: Nov. 18, 2021

(65) Prior Publication Data

US 2022/0073784 A1 Mar. 10, 2022

Related U.S. Application Data

(63) Continuation of application No. PCT/EP2020/065085, filed on May 29, 2020.

(30) Foreign Application Priority Data

May 31, 2019 (GB) .................................... 1907805

(51) Int. Cl.
*C09D 175/14* (2006.01)
*F16L 15/04* (2006.01)

(52) U.S. Cl.
CPC ............ *C09D 175/14* (2013.01); *F16L 15/04* (2013.01)

(58) Field of Classification Search
CPC .................................... C09K 3/10; C09K 3/12
See application file for complete search history.

(56) References Cited

U.S. PATENT DOCUMENTS

| | | |
|---|---|---|
| 3,218,305 A | 11/1965 | Krieble |
| 4,180,640 A | 12/1979 | Doherty et al. |
| 4,287,330 A | 9/1981 | Rich |
| 4,321,349 A | 3/1982 | Rich |
| 7,041,747 B1 * | 5/2006 | Attarwala ............. C08F 299/02 525/308 |
| 10,526,509 B2 | 1/2020 | Ledwith et al. |

FOREIGN PATENT DOCUMENTS

| | | |
|---|---|---|
| CN | 105176422 A | 12/2015 |
| DE | 2225903 A1 | 12/1973 |

* cited by examiner

*Primary Examiner* — Catherine S Branch
(74) *Attorney, Agent, or Firm* — Steven C. Bauman

(57) ABSTRACT

A curative free sealant composition for sealing joints between male and female parts, the sealant composition comprising a solid resin component, a solid (meth)acrylate polyurethane component, and an ethoxylated bisphenol-A (meth)acrylate component.

27 Claims, No Drawings

CURATIVE FREE JOINT SEALANT

FIELD

The present invention relates to a curative free sealant composition. Of interest are sealant compositions useful for sealing joints. Joints to be sealed include those joining conduits for fluids or gases. For example the joints may be pipe joints. The invention is useful in the plumbing industry. Of particular interest are materials for sealing threaded pipe joints.

BRIEF DESCRIPTION OF RELATED ART

Non-curing and solvent-based sealing compounds, PTFE tape and hemp & paste have been commonly used to prevent leakage of gases and liquids from pipe joints which are subject to vibration, changing pressures and temperatures. These are pastes made from oils and fillers and although they lubricate and compact into the threads creating a seal, they provide no locking. Furthermore they can squeeze out under pressure, have poor solvent resistance and do not work on parallel threads.

Solvent-based sealing compounds also lubricate and compact into the threads creating a seal although fittings must be re-torqued to minimise the voids. Their greatest disadvantage is that they shrink during cure, as the solvents evaporate, compromising the efficiency of the seal.

PTFE tape gives a good initial seal and resists chemical attack. Although its ability to act as a lubricant is an advantage is one respect, this action also prompts fittings to loosen under dynamic loads causing loss of clamping force and leakage. It also encourages over-tightening of fasteners, adding stress or fracturing parts. A lot of experience with PTFE tape is needed to ensure consistent results, particularly where a fitting needs to be tightened up to a particular position or torque.

Hemp and paste has been used for many years but it is messy and slow to assemble requiring a degree of experience and technique to achieve a complete seal. Another disadvantage of this sealing method is it cannot be used on fittings carrying potable water.

Notwithstanding the various products which have been made in the past, there still exists a need for alternatives.

SUMMARY

In one aspect the present invention provides a curative free sealant composition for sealing joints between male and female parts, the sealant composition comprising:
(a) a solid resin component,
(b) a solid (meth)acrylate polyurethane component,
(c) an ethoxylated bisphenol-A (meth)acrylate component.

The mating parts may for example be reciprocally threaded parts where one part (screw) threads into another for engagement between the parts. The parts may be any mating parts, but of particular interest in the present invention are threaded pipe joints where a first (e.g., male) part screw threads into a second (e.g., female) part. Once the parts are mated, the composition does not cure (for example it is uncured for at least 72 hours at room temperature and remains uncured after 72 hours at room temperature) as the composition is curative free. Once the parts are mated the composition forms a seal (without curing) between the mated parts. Beneficially the composition forms a seal without the need to cure.

The curative free sealant composition does not comprise (and is free of) cure-inducing (cure initiator) components which initiate cure such as anaerobic cure. For example the composition is does not comprise (and is free of) toluidines, such as N,N-diethyl-p-toluidine ("DE-p-T") and N,N-dimethyl-o-toluidine ("DM-o-T"), and acetyl phenyl hydrazine ("APH") with maleic acid. For examples of such components see e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). The curative free composition of the present invention does not comprise toluidines, such as N,N-diethyl-p-toluidine ("DE-p-T") and N,N-dimethyl-o-toluidine ("DM-o-T"), and acetyl phenyl hydrazine ("APH") with maleic acid.

The curative free sealant composition does not comprise cure accelerators. Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH. The curative free composition of the present invention does not comprise saccharin and/or APH.

The composition may consist (essentially) of:
(a) a solid resin component,
(b) a solid (meth)acrylate polyurethane component,
(c) an ethoxylated bisphenol-A (meth)acrylate component.

The curative free sealant composition of the invention may be dry to touch.

The composition of the invention comprises a solid resin component which may have a melting temperature range from about 55° C. to about 80° C. and a resolidification temperature range of from 25° C. to 55° C. as measured by differential scanning calorimetry according to ISO 11357-1:2016. Beneficially a solid resin component with this melting temperature range and resolidification temperature range forms a composition which forms a seal without the need to cure, for example a joint sealed with a composition comprising a solid resin component which has a melting temperature range from about 55° C. to about 80° C. and a resolidification temperature range of from 25° C. to 55° C. as measured by differential scanning calorimetry according to ISO 11357-1:2016 remains sealed when exposed to internal pressure of 0.8 MPa for 5 minutes as measured in accordance with British Standard BS EN 751-2.

The composition of the invention comprises a solid resin component which may have a melting temperature range from about 55° C. to about 80° C. and a resolidification temperature range of from 25° C. to 55° C. as measured by differential scanning calorimetry according to ISO 11357-1:2016. For example the solid resin component may have a melting temperature range of 57° C. to 67° C. and a resolidification temperature range of from 26° C. to 38° C., for example the solid resin component may have a melting temperature range of 56° C. to 66° C. and a resolidification temperature range of from 25° C. to 36° C., for example the solid resin component may have a melting temperature range of 70° C. to 80° C. and a resolidification temperature range of from 45° C. to 55° C., for example the solid resin component may have a melting temperature range of 70° C. to 80° C. and a resolidification temperature range of from 36° C. to 49° C. as measured by differential scanning calorimetry according to ISO 11357-1:2016.

In the composition of the invention the solid resin component may have a molecular weight of about 2,000 g/mol or higher, for example wherein the solid resin component is a copolyester resin with a molecular weight of about 2,000 g/mol or higher or a (meth)acrylated polyurethane resin with a molecular weight of about 2,000 g/mol or a combination thereof. For example the solid resin component may have a molecular weight in the range from 2,500 to 40,000 g/mol. The solid resin component may have a melt viscosity of from about 0.5 to about 20 Pa·s measured using an Anton Paar Rheometer Modular Compact Rheometer at 80° C. at a shear rate of one reciprocal second.

In the composition of the invention the solid resin component may be a polyol such as a polyester polyol.

In the composition of the invention the solid resin component may be a crystalline polyol. Suitably the solid resin component is not amorphous.

The composition of the invention may have a melting point of from about 15° C. to about 100° C., for example a melting point of from about 30° C. to about 100° C., such as a melting point of from about 40° C. to about 100° C., for example a melting point of from about 50° C. to about 100° C. Such temperatures compare favourably with the temperatures utilised to dry liquid based formulations. The melting point may be determined by differential scanning calorimetry according to ISO 11357-1:2016.

In the composition of the invention the solid (meth) acrylate polyurethane component may have a melting point in the range of from about 30° C. to about 100° C. The melting point may be determined by differential scanning calorimetry according to ISO 11357-1:2016.

The composition of the invention may have a re-solidification point (after melting) in the range from about 10° C. to about 50° C. such as from about 20° C. to about 50° C., for example from about 30° C. to about 50° C. Having a re-solidification point in this range means that typically the material will re-solidify when ambient conditions have a temperature of 30° C. or lower. So the composition will re-solidify under typical ambient conditions. It is understood that re-solidification may not occur at a single temperature but instead occur over a temperature range. In any event for the purposes of this invention the end point temperature for re-solidification is desirably at or above 10° C., that is when exposed to temperatures below the re-solidification point temperature the composition will turn back to its solid form. The re-solidification point or range can be determined by differential scanning calorimetry according to ISO 11357-1:2016.

In the composition of the invention the solid resin component may be present in an amount of from about 10 to about 60% by weight based on the total weight of the composition, such as from about 25 to about 50%, for example from about 30 to about 40% by weight based on the total weight of the composition.

In the composition of the invention the solid (meth) acrylate polyurethane component may be present in an amount of from about 10% to about 45% by weight based on the total weight of the composition.

In the composition of the invention the solid (meth) acrylate polyurethane component may have a molecular weight of about 1,000 g/mol or lower.

In the composition of the invention the solid (meth) acrylate polyurethane component may have a molecular weight of from about 100 g/mol to about 500 g/mol, from example from about 200 g/mol to about 300 g/mol.

For example the solid (meth)acrylate polyurethane may include diisocyanates capped with hydroxyethyl methacrylate such as:

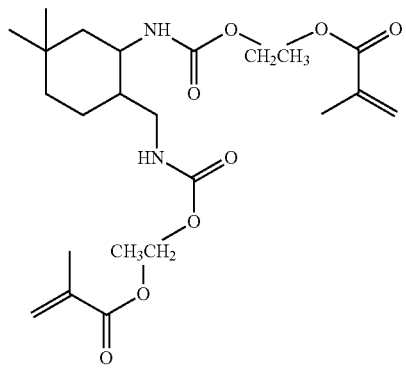

which is HEMA-IPDI-HEMA with a melting point of about 72-74° C.; or

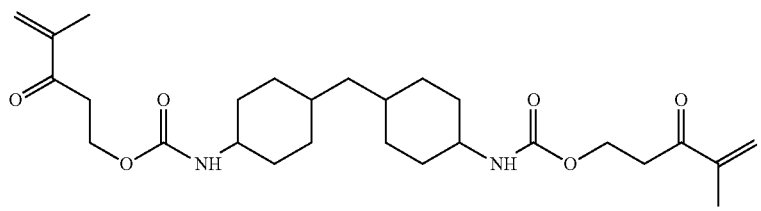 [SMILES: C=C(C)C(=O)CCOC(=O)NC1CCC(CC2CCC(NC(=O)OCCC(=O)C(=C)C)CC2)CC1]

which is HEMA-hMDI-HEMA with a melting point of about 75-85° C.; or

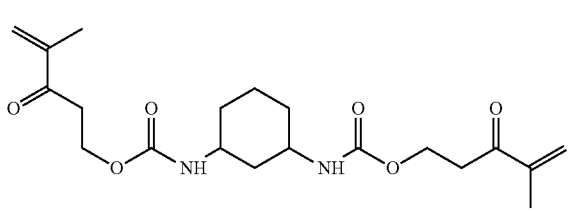 [SMILES: C=C(C)C(=O)CCOC(=O)NC1CCCC(NC(=O)OCCC(=O)C(=C)C)C1]

which is HEMA-6HXDI-HEMA (This material is "RRT600" "in the Examples below) with a melting point of about 75-85° C.: or

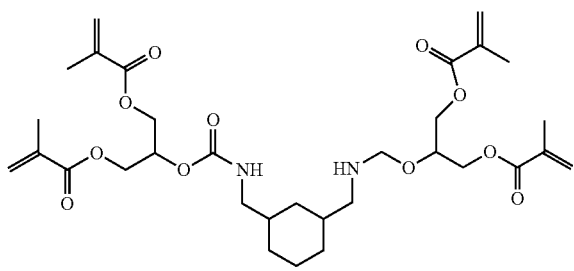 [SMILES: C=C(C)C(=O)OCC(COC(=O)C(=C)C)OCNCC1CCCC(CNC(=O)OC(COC(=O)C(=C)C)COC(=O)C(=C)C)C1]

which is Glycerol Dimethacrylate-6HXDI-Glycerol Dimethacrylate (This material is "4RRT600" in the Examples below) with a melting point in the range from about 75 to about 85° C.

In the composition of the invention the ethoxylated bisphenol-A (meth)acrylate component may be present in an amount of from about 10% to about 40% by weight based on the total weight of the composition.

For example the composition may include Bisphenol A dimethacrylate:

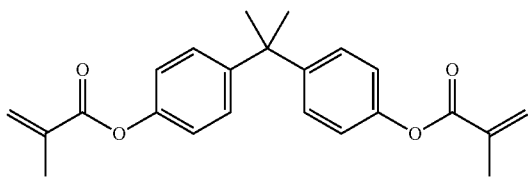 [SMILES: C=C(C)C(=O)Oc1ccc(C(C)(C)c2ccc(OC(=O)C(=C)C)cc2)cc1]

which has a melting point of approximately 72 to 74° C., or
Diethoxylated bisphenol A dimethacrylate;

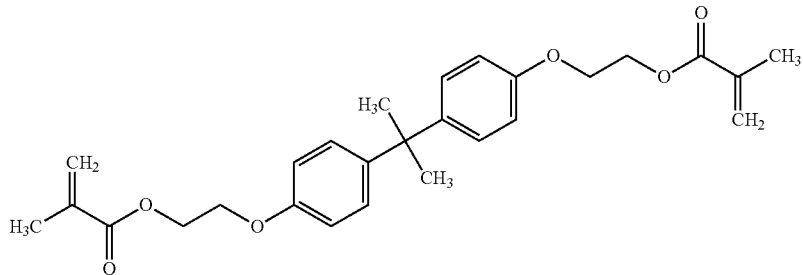 [SMILES: C=C(C)C(=O)OCCOc1ccc(C(C)(C)c2ccc(OCCOC(=O)C(=C)C)cc2)cc1]

or the degree of ethoxylation can be altered further:

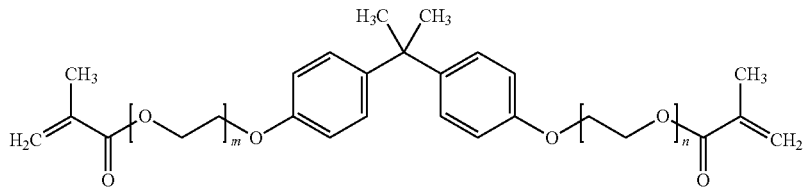

wherein n+m=2 to 30.

The composition of the invention may be solvent-free comprising less than 1% solvent by weight based on the total weight of composition and wherein the solvent is for example organic solvent or water. One advantage is that the compositions of the invention can be made and/or applied to a substrate in a manner that does not require use of a solvent, such as an organic solvent or water. This avoids the necessity for a liquid carrier for the composition. A curative free sealant material of the invention is thus essentially dry to touch with consequent handling advantages. For example the compositions for use in the invention will flow when melted or when in particulate form and there is no requirement for a liquid carrier, and there is no requirement for drying off of solvent or water to achieve application to the mating parts.

Dry-handling of the sealant composition, for example on production lines, is thus both achievable and advantageous. Once applied compositions of the invention will also be dry to touch. Dry to touch products are desirable from a handling point of view to eliminate contamination, fouling, spillages, loss of composition from a substrate etc.

The sealant composition of the invention are suitable for storage or handling for instance during shipping even when applied on a part. This storage or handling does not adversely affect the integrity of the applied composition.

A further advantage of the compositions of the present invention is that there is no cross contamination when a sealant composition of the invention touches another article.

The composition of the invention may be provided in solid form. In this respect solid means non-flowable at ambient temperature and with a melting point above about 30° C. Thus, solid does not mean gel.

In respect of the present invention tack free means that the composition has a Shore A Hardness of greater than 5. Compositions which have a Shore A hardness less than 5 are not suitable as they are too tacky for dry handling of the composition.

In one aspect the present invention provides a method of sealing joints between male and female mating parts by:
(a) providing a composition according to the invention;
(b) applying the composition to at least one mating part by melting; and (c) subsequently, and optionally after active or passive cooling, joining the mating parts so as form a joint between the male and female mating parts wherein the joint between the male and female mating parts is sealed.

The mating parts may for example be reciprocally threaded parts where one part (screw) threads into another for engagement between the parts.

The method of the invention may comprise the steps of heating the mating part of an article to be sealed to a temperature sufficient to melt the composition.

It is understood by the person skilled in the art that in order to apply compositions for use in the invention sufficient melting may be carried out to allow application of the composition to the mating parts in a manner in which it adheres. Melting the composition for application avoids the necessity for a liquid carrier for the composition. The expression tack free and dry to the touch relate to the composition after it has been (melted and) applied to the mating part and then has (re) solidified. A test to determine that the mating part is dry to the touch should only be conducted after the composition is no longer in melted form. For example the testing should be done at least about 30 minutes after the composition is applied.

According to the method of the invention preferably at least one of the female mating part or the male mating part or both mating parts are formed from a metal, for example steel, copper, or brass.

A system comprising a sealed joint is provided wherein the joint is sealed by the method of the invention.

In the system of the invention the sealed joint permits the passage of fluid or gas through the male and female mating parts. Beneficially the joint remains sealed when placed under pressure from the fluid or gas.

In one aspect the invention provides a sealed joint comprising a male mating part and a female mating part and the composition to the invention.

The sealed joint according to the invention may be a joint in which the male mating part or the female mating part or both are formed from a metal, for example steel, copper, or brass.

The sealed joint according to the invention may be a joint in which the joint remains sealed when exposed to internal pressure of 0.8 MPa for 5 minutes as measured in accordance with British Standard BS EN 751-2.

The sealed joint according to the invention may be a joint in which the joint remains sealed when exposed to internal pressure of 0.8 MPa for 5 minutes after the mating parts are turned back as measured in accordance with British Standard BS EN 751-2.

Surprisingly it has been found that such a sealant composition can seal joints such as pipe joints and can maintain a seal after the pipes have been turned back. Beneficially the sealant composition of the invention is curative free and does not cure. Turn back of pipes allows alterations to be made to joints when pipe systems are being installed. The joints formed from the mating parts can be adjusted, one mating part can be rotated whilst maintaining a seal formed by the composition of the invention. A curable composition would become brittle and break when turned back.

The sealed joint according to the invention may be a joint in which the joint remains sealed when exposed to internal pressure of 0.8 MPa for 5 minutes after the mating parts are turned back after 72 hours as measured in accordance with British Standard BS EN 751-2.

The sealed joint according to the invention may be a joint in which the joint remains sealed when exposed to internal pressure of 0.8 MPa for 5 minutes after the sealed joint is exposed to a temperature of 130° C. for 168 hours as measured in accordance with British Standard BS EN 751-2.

The sealed joint according to the invention may be a joint in which the joint remains sealed when exposed to internal pressure of 0.8 MPa for 5 minutes after the sealed joint is temperature cycled as measured in accordance with British Standard BS EN 751-2 wherein the sealed joint is:

(a) heated to 100° C. for 22 hours and cooled to 20° C. for 2 hours, (b) step (a) is repeated 5 times, (c) subsequently cooling the sealed joint to −20° C. for 4 hours, and (d) heating the sealed joint to 20° C. for 2 hours.

Surprisingly it has been found that such a sealant composition can easily seal joints such as pipe joints and can resist temperature cycling while still maintaining a seal. Compositions which cure have a tendency to be brittle and break, therefore not maintaining a seal when exposed to heat cycling. The curative free composition of the invention maintains a seal when exposed to heat cycling.

In one aspect the use of a composition of the invention is for use for sealing joints between male and female mating parts.

DETAILED DESCRIPTION

A curative free sealant composition for sealing joints according to the present invention were prepared as set out in the following Experimental section.

Experimental

An example of a composition that may be considered a basis for formulating (100%) curative free sealant compositions are given below in table 1:

| Component | Wt % (based on total weight of the composition) |
| --- | --- |
| Solid Resin | 10-60 |
| Solid (meth)acrylate | 25-45 |
| Ethoxylated bisphenol-A (meth)acrylate | 10-40 |
| Total | 100 |

A key prerequisite of the resins and solid (meth)acrylate used is that they are in general solids at room temperature and have a melting point of <100° C.

Preparation

The raw materials are formulated together at a temperature just above the melting point of the individual components. When the formulation has a homogenous appearance, it is allowed to cool to room temperature. At this point it is solid.

EXAMPLES

The following compositions were prepared wherein the solid resin is Dynacoll 7380 and the solid (meth)acrylate is 2-Methacryloxyethyl phenyl urethane:

| Material Sample | Dynacoll 7380 | 2-Methacryloxyethyl phenyl urethane | Ethoxylated bisphenol-A (meth)acrylate |
|---|---|---|---|
| | Wt % (based on total weight of the composition) | | |
| Test 1 | 33.3 | 33.3 | 33.3 |
| Test 2 | 30 | 30 | 40 |
| Test 3 | 40 | 40 | 20 |
| Test 4 | 45 | 45 | 10 |
| Test 5 | 36 | 36 | 28 |
| Comparative test 1 | 15 | 15 | 70 |
| Comparative test 2 | 25 | 25 | 50 |

Shore a Hardness Testing

Test samples 1, 3-5 and the comparative test specimens were tested for Shore A hardness using a Durometer. The test samples achieved a Shore A hardness above 5. The comparative samples were too soft to measure.

Joint Sealing

The sealant composition was heated until molten and applied to a male pipe. The coated pipes were left overnight before assembly of the male and female pipes.

Test 1: Internal Pressure Test after Assembly

The specimens were tested between 30-60 minutes after the assembly following the testing method of BS EN 751-2. The pipes were immersed in a water bath at about 23° C. Compressed air at a pressure of 8 bar (0.8 MPa)+1 bar (0.1 MPa) was used to pressurise the test specimen. Gas leakage was determined by the appearance of bubbles during an immersion period of 5 minutes, ignoring those bubbles noted during the first 15 seconds of immersion.

Test 2: Turn Back Test

The test assemblies were turned back by 45°. 10 minutes and 72 hours after turn back the internal pressure test for leaks was repeated with compressed air.

Test 3: Hot Water Resistance Test

The test assemblies were half filled with tap water and closed with a plug seal. The assemblies were placed in an oven at 130° C. in a horizontal position for 168 hours. After this period of time, the assemblies were cooled to room temperature for 2 hours, the plug was removed and the water drained. The internal pressure test for leaks was repeated with compressed air.

Test 4: Temperature Cycling Test

The test assemblies were placed into a temperature chamber at 150° C. for 22 hours and then cooled down to 20° C. for 2 hours. The temperature cycling test was repeated times. The specimens were then cooled down to −20° C. for 4 hours and warmed to 20° C. for 2 hours. The internal pressure test for leaks was repeated with compressed air.

The following compositions were prepared wherein the solid resin is a urethane methacrylate end capped crystalline polyol and the solid (meth)acrylate is 2-Methacryloxyethyl phenyl urethane:

| Material Sample | Urethane methacrylate end capped crystalline polyol | 2-Methacryloxyethyl phenyl urethane | Ethoxylated bisphenol-A (meth)acrylate |
|---|---|---|---|
| | Wt % (based on total weight of the composition) | | |
| Test 6 | 33.3 | 33.3 | 33.3 |

Comparative Example 3

The following composition was prepared wherein a curable component (Loctite 577 which comprises the an anaerobic curative system) was included:

| Material Sample | Loctite 577 | Dynacoll 7380 | 2-Methacryloxyethyl phenyl urethane | Ethoxylated bisphenol-A (meth)acrylate |
|---|---|---|---|---|
| | Wt % (based on total weight of the composition) | | | |
| Comparative test 3 | 35 | 40 | 15 | 10 |

The results are as follows:

| Sample | Internal pressure test | Turn back test | Hot water resistance test | Temperature cycling test | Shore A hardness |
|---|---|---|---|---|---|
| Test 1 | Passed | Passed | Passed | Passed | 6.2 |
| Test 2 | Passed | Passed | Passed | Passed | — |
| Test 3 | Passed | Passed | Passed | Passed | 46.4 |
| Test 4 | Passed | Passed | Passed | Passed | 48.2 |
| Test 5 | Passed | Passed | Passed | Passed | 77.4 |
| Test 6 | Passed | Passed | Passed | Passed | — |
| Comparative test 1 | Failed | NA | NA | NA | Too soft to measure |
| Comparative test 2 | Failed | NA | NA | NA | Too soft to measure |
| Comparative test 3 | Passed | Failed | Passed | Failed | Too soft to measure |

Differential Scanning Calorimetry (DSC)

Differential Scanning calorimetry (DSC) can show the physical characteristics of the functionalised resins by determining their heat flux responses to changes in thermal conditions. Samples were analysed using a Perkin Elmer DSC 6000. Samples to be analysed were placed in amounts of 10-15 mg in aluminium pans and placed on a sample holder within the furnace. Samples were heated from −30° C. to 100° C. at a rate of 10° C. per minute and then cooled to −20° C. at a rate of 10° C./min to determine the melting and resolidifcation temperature range according to ISO 11357-1:2016. Samples were prepared as above. The samples were prepared as below.

| Sample | Polyester polyol used | Polyester polyol (Wt %) | 2-Methacryloxyethyl phenyl urethane (Wt %) | Ethoxylated bisphenol-A (meth)acrylate (Wt %) |
|---|---|---|---|---|
| Example 7 | Dynacoll 7360 | 40 | 30 | 30 |
| Example 8 | Dynacoll 7362 | 40 | 30 | 30 |
| Example 9 | Dynacoll 7380 | 40 | 30 | 30 |
| Example 10 | Dynacoll 7381 | 40 | 30 | 30 |
| Example 11 | Dynacoll 7250 & 7380 blend | 20:20 blend | 30 | 30 |
| Example 12 | Dynacoll 7360 & 7380 blend | 20:20 blend | 30 | 30 |

-continued

| Sample | Polyester polyol used | Polyester polyol (Wt %) | 2-Methacryloxyethyl phenyl urethane (Wt %) | Ethoxylated bisphenol-A (meth)acrylate (Wt %) |
|---|---|---|---|---|
| Comparative example 4 | Dynacoll 7130 | 40 | 30 | 30 |
| Comparative example 5 | Dynacoll 7150 | 40 | 30 | 30 |
| Comparative example 6 | Dynacoll 7250 | 40 | 30 | 30 |
| Comparative example 7 | Dynacoll 7390 | 40 | 30 | 30 |
| Comparative example 8 | Dynacoll 7250 & 7390 blend | 20:20 blend | 30 | 30 |

The crystalline polyol in examples 7 to 12 and comparative examples 4 to 8 were tested to determine the melting and resolidifcation temperature range according to ISO 11357-1:2016. Where possible a composition was formulated and tested to determine the melting and resolidifcation temperature range according to ISO 11357-1:2016 and an Internal pressure test after assembly was performed. The results are shown below.

| | Polyester polyol | | Composition | | |
|---|---|---|---|---|---|
| | Melting range (° C.) | Resolidification range (° C.) | Melting range (° C.) | Resolidification range (° C.) | Internal pressure test |
| Example 7 | 57-67 | 26-38 | 15-30 & 30-45 | NA | Passed |
| Example 8 | 56-66 | 25-36 | 15-30 & 31-45 | 33-41 | Passed |
| Example 9 | 70-80 | 45-55 | 48-60 | 23-32 | Passed |
| Example 10 | 70-80 | 36-49 | 33-54 | 12-24 | Passed |
| Example 11 | — | — | 51-54 | 28-36 | Passed |
| Example 12 | — | — | 25-35 & 50-70 | 29-37 | Passed |
| Comparative example 4 | 27-42 | No resolidification | NA | NA | NA |
| Comparative example 5 | 59-66 | No resolidification | NA | NA | NA |
| Comparative example 6 | 2-14 | No resolidification | NA | NA | Failed |
| Comparative example 7 | 110-120 | 60-75 | NA | NA | NA |
| Comparative example 8 | NA | NA | NA | NA | NA |

The crystalline polyester polyols in examples 7 to 10 have a melting temperature range from 55° C. to 80° C. and a resolidification temperature range of from 25° C. to 55° C. Compositions prepared using these crystalline polyester polyols pass an internal pressure test.

The amorphous and semi-crystalline polyester polyols in comparative examples 4 to 7 do not have both a melting temperature range from 55° C. to 80° C. and a resolidification temperature range of from 25° C. to 55° C. For example comparative examples 4 and 5 while having a melting temperature range from 55° C. to 80° C. do not resolidify. These amorphous or semi-crystalline polyols did not mix with the other components to form a composition. In Comparative example 6 the semi-crystalline polyol did not resolidify, however it was possible to formulate a composition but this composition did not pass the internal pressure test.

Blends of crystalline polyols have a melting temperature range from 55° C. to 80° C. and a resolidification temperature range of from 25° C. to 55° C. can be blended with polyols which may not have a resolidification temperature range to form a composition which passes an instant seal test, for comparative example 8. Blends of polyols in which none of the polyols have a resolidification temperature range do not form a composition which passes the instant seal test.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A curative free sealant composition for sealing joints between male and female parts, the sealant composition comprising:
   (a) a solid resin component,
   (b) a solid (meth)acrylate polyurethane component, and
   an ethoxylated bisphenol-A (meth)acrylate component,
      wherein the solid (meth)acrylate polyurethane component is one or more of

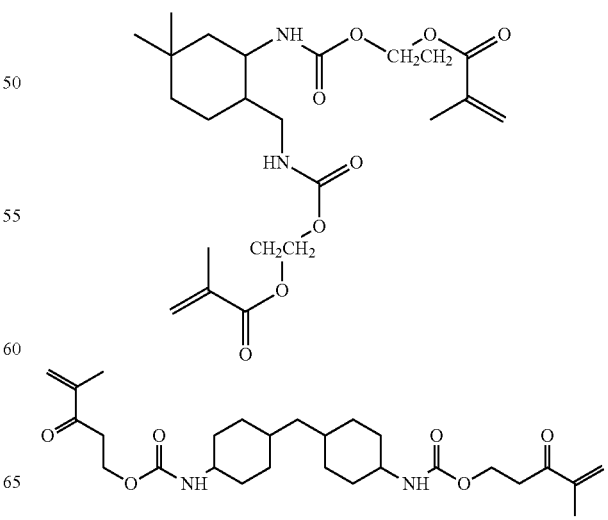

-continued

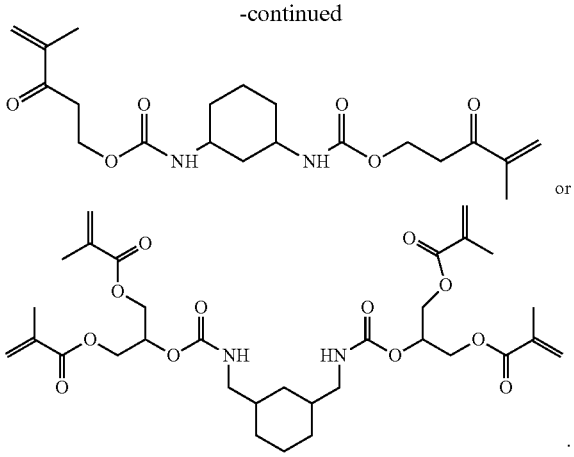

2. The composition of claim 1 wherein the composition consists of:
(c) a solid resin component,
(d) a solid (meth)acrylate polyurethane component, and an ethoxylated bisphenol-A (meth)acrylate component, wherein the solid (meth)acrylate polyurethane component is one or more of

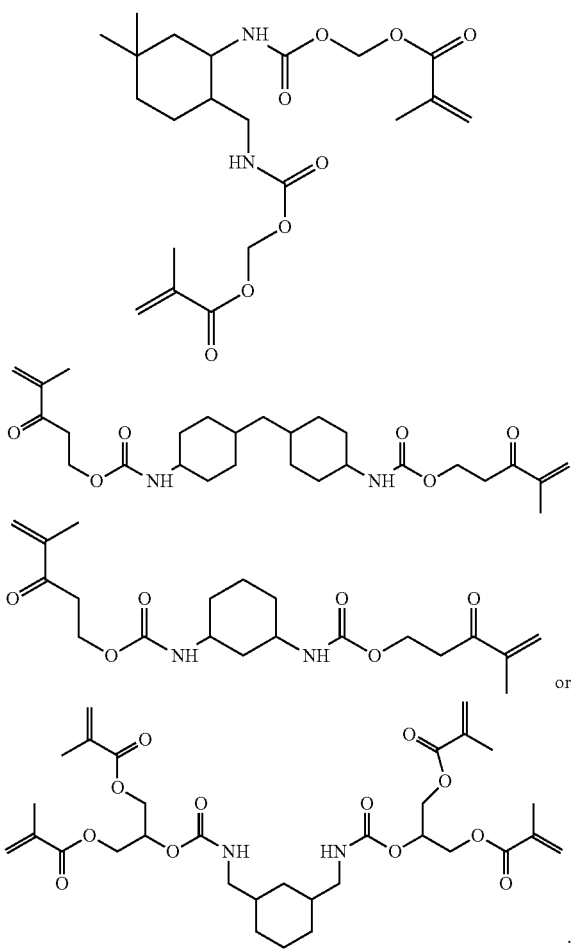

3. The composition of claim 1 wherein the composition is free of cure inducing components.

4. The composition of claim 1 wherein the composition is free from cure accelerators.

5. The composition according to claim 1 wherein the solid resin component has a molecular weight of about 2,000 g/mol or higher.

6. The composition according to claim 1 wherein the solid resin component has a melting temperature range from about 55° C. to about 80° C. and a re-solidification temperature range of from 25° C. to 55° C. as measured by differential scanning calorimetry according to ISO 11357-1:2016.

7. The composition according to claim 1 wherein the composition has a melting point of from about 15° C. to about 100° C.

8. The composition according to claim 1 wherein the solid (meth)acrylate polyurethane component has a melting point in the range of from about 30° C. to about 100° C. and a molecular weight of about 1,000 g/mol or lower.

9. The composition according to claim 1 wherein the composition has a re-solidification point in the range from about 10° C. to about 50° C.

10. The composition according to claim 1 wherein the solid resin component is present in an amount of from about 10% to about 60% by weight based on the total weight of the composition, based on the total weight of the composition.

11. The composition according to claim 1 wherein the solid (meth)acrylate polyurethane component is present in an amount of from about 10% to about 45% by weight based on the total weight of the composition.

12. The composition according to claim 1 wherein the solid (meth)acrylate polyurethane component has a molecular weight in the range of about 100 g/mol to about 500 g/mol.

13. The composition according to claim 1 wherein the ethoxylated bisphenol-A (meth)acrylate component is present in an amount of from about 10% to about 40% by weight based on the total weight of the composition.

14. The composition according to claim 1 wherein the composition is solvent-free comprising less than 1% solvent by weight based on the total weight of composition and wherein the solvent is organic solvent or water.

15. The composition according to claim 1 wherein the composition is provided in solid form.

16. A method of sealing joints between male and female mating parts by:
a. providing a composition according to claim 1;
b. applying the composition to at least one mating part by melting; and
c. subsequently, and optionally after active or passive cooling, joining the mating parts so as form a joint between the male and female mating parts wherein the joint between the male and female mating parts is sealed.

17. The method according to claim 16 comprising the steps of heating the mating part of an article to be sealed to a temperature sufficient to melt the composition.

18. The method according to claim 16 wherein at least one of the female mating part or the male mating part or both mating parts are formed from a metal.

19. A system comprising a sealed joint wherein the joint is sealed by the method according to claim 16, optionally wherein the sealed joint permits the passage of fluid or gas through the male and female mating parts.

20. A sealed joint comprising a male mating part and a female mating part and the composition according to claim 1.

21. The sealed joint according to claim 20 wherein at the male mating part or the female mating part or both are formed from a metal.

22. The sealed joint according to claim 20 wherein the joint remains sealed when exposed to internal pressure of 0.8 MPa for 5 minutes as measured in accordance with British Standard BS EN 751-2.

23. The sealed joint according to claim 20 wherein the joint remains sealed when exposed to internal pressure of 0.8 MPa for 5 minutes after the mating parts are turned back as measured in accordance with British Standard BS EN 751-2, optionally wherein the joint remains sealed when exposed to internal pressure of 0.8 MPa for 5 minutes after the mating parts are turned back up to 72 hours as measured in accordance with British Standard BS EN 751-2.

24. The sealed joint according to claim 20 wherein the joint remains sealed when exposed to internal pressure of 0.8 MPa for 5 minutes after the sealed joint is exposed to a temperature of 130° C. for 168 hours as measured in accordance with British Standard BS EN 751-2.

25. The sealed joint according to claim 20 wherein the joint remains sealed when exposed to internal pressure of 0.8 MPa for 5 minutes after the sealed joint is temperature cycled as measured in accordance with British Standard BS EN 751-2 wherein the sealed joint has been:

a. heated to 100° C. for 22 hours and cooled to 20° C. for 2 hours,
    b. repeated (a) 5 times,
    c. subsequently cooled to −20° C. for 4 hours, and
    d. heated to 20° C. for 2 hours.

26. The composition of claim 1, wherein the solid (meth) acrylate polyurethane component has a melting point in the range of from about 30° C. to about 100° C. and a molecular weight of about 1,000 g/mol or lower.

27. The composition of claim 1, wherein
the solid resin component is a polyester polyol;
the solid resin component has a melting temperature range from 55° C. to 80° C. and a resolidification temperature range of from 25° C. to 55° C. as measured by differential scanning calorimetry according to ISO 11357-1:2016; and
the solid resin component is present in an amount of from 30% to 45% by weight, the solid (meth)acrylate polyurethane component is present in an amount of from 30% to 45% by weight, and the ethoxylated bisphenol-A (meth)acrylate component is present in an amount of from 10% to 40% by weight, based on the total weight of the composition.

* * * * *